United States Patent [19]

Girard

[11] Patent Number: 5,574,623
[45] Date of Patent: Nov. 12, 1996

[54] DEVICE PANEL WITH IN-MOLDED APPLIQUE

[75] Inventor: Leland K. Girard, Geneva, Ill.

[73] Assignee: Master Molded Products Corporation, Elgin, Ill.

[21] Appl. No.: 395,966

[22] Filed: Feb. 28, 1995

[51] Int. Cl.$^6$ .................................................. H02B 1/04
[52] U.S. Cl. ......................... 361/627; 200/296; 200/512; 361/792
[58] Field of Search ........................... 174/48, 52.1, 52.2, 174/52.3; 200/85 R, 85 A, 86 R, 86.5, 292, 296, 512, 517, 341, 310, 302.2; 248/27.1; 264/129, 132, 240, 241, 273, 274; 307/10.1, 119, 140; 340/573, 665, 666; 428/42, 77, 40, 195, 202, 332, 337; 439/544, 548, 620, 716–719; 361/627, 628, 631, 641, 643, 644, 647, 789, 792, 795, 807, 809, 810

[56] References Cited

U.S. PATENT DOCUMENTS

| | | |
|---|---|---|
| 4,028,509 | 6/1977 | Zurcher ..................................... 200/5 A |
| 4,145,584 | 3/1979 | Otterlei ..................................... 200/5 A |
| 4,387,127 | 6/1983 | Ogden ........................................ 428/42 |
| 4,804,569 | 2/1989 | Arisawa . |
| 4,917,927 | 4/1990 | Sakaitani et al. . |
| 5,264,172 | 11/1993 | Rosica et al. . |
| 5,280,146 | 1/1994 | Inagaki ..................................... 200/341 |
| 5,285,038 | 2/1994 | Asher ....................................... 200/314 |
| 5,430,266 | 7/1995 | Austin, Jr. ............................. 200/302.1 |

*Primary Examiner*—Gerald P. Tolin
*Attorney, Agent, or Firm*—Trexler, Bushnell, Giangiorgi & Blackstone, Ltd.

[57] ABSTRACT

A method of producing a molded assembly for at least partially encapsulating a touch panel structure. The method includes providing a touch panel structure which has a front side, a reverse side and an edge extending therebetween. A circuit is attached to the panel structure and includes at least one device. The panel is positioned in a cavity of a plastic injection mold which includes a hollow shutoff positioned relative to the device on the touch panel. When the mold is closed, a rim portion of the hollow shutoff is positioned against the reverse side of the panel spaced away from the device so as to at least partially shield the portion of the panel containing the device from the injection molding environment. The present invention also envisions a product produced by this method. The present invention further envisions a molded assembly which includes a touch panel in which the touch panel is retained in a molded portion and the devices associated with the touch panel are not degraded during the molding process. A window is provided on the reverse side of the touch panel. Additionally, a barrier material may be applied to the reverse side of the panel prior to molding so as to form a seal between the molded portion and the touch panel in the area of the window positioned relative to the device.

14 Claims, 2 Drawing Sheets

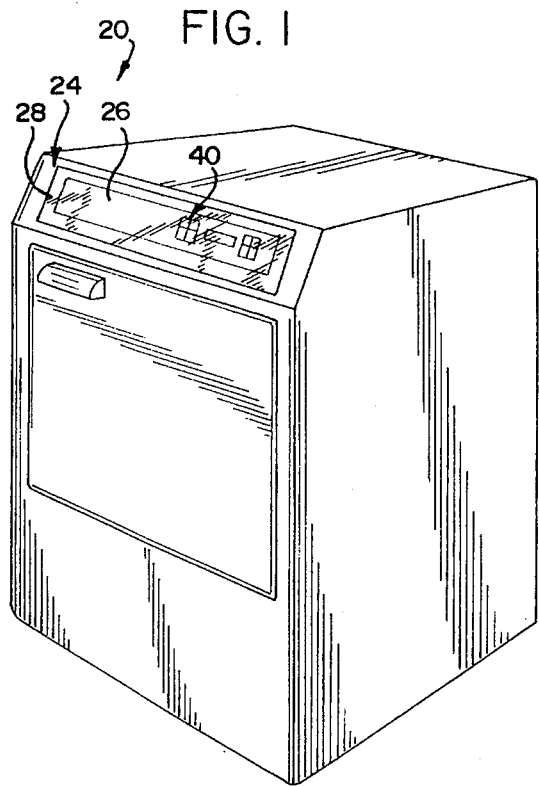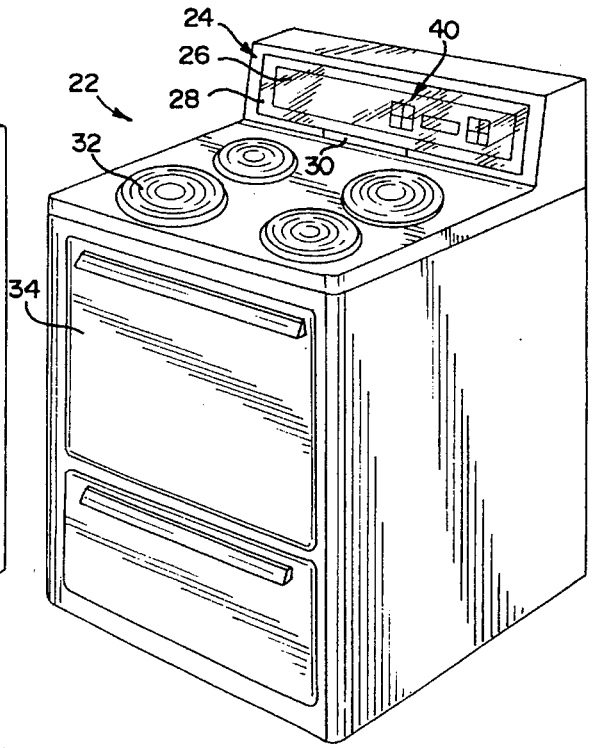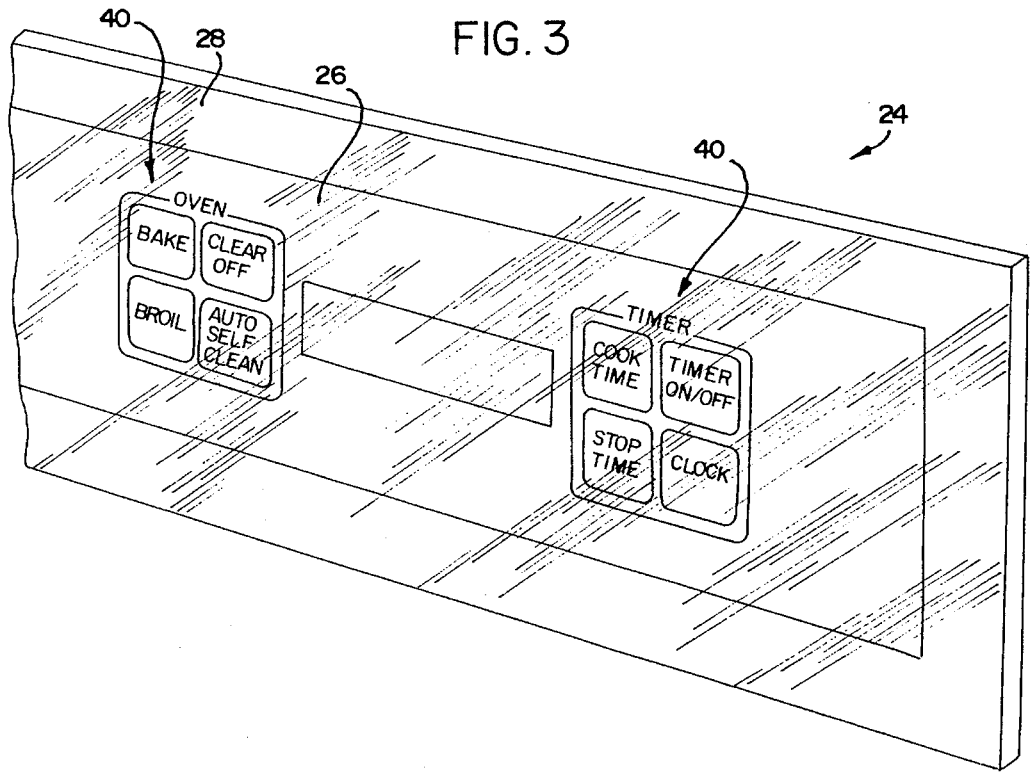

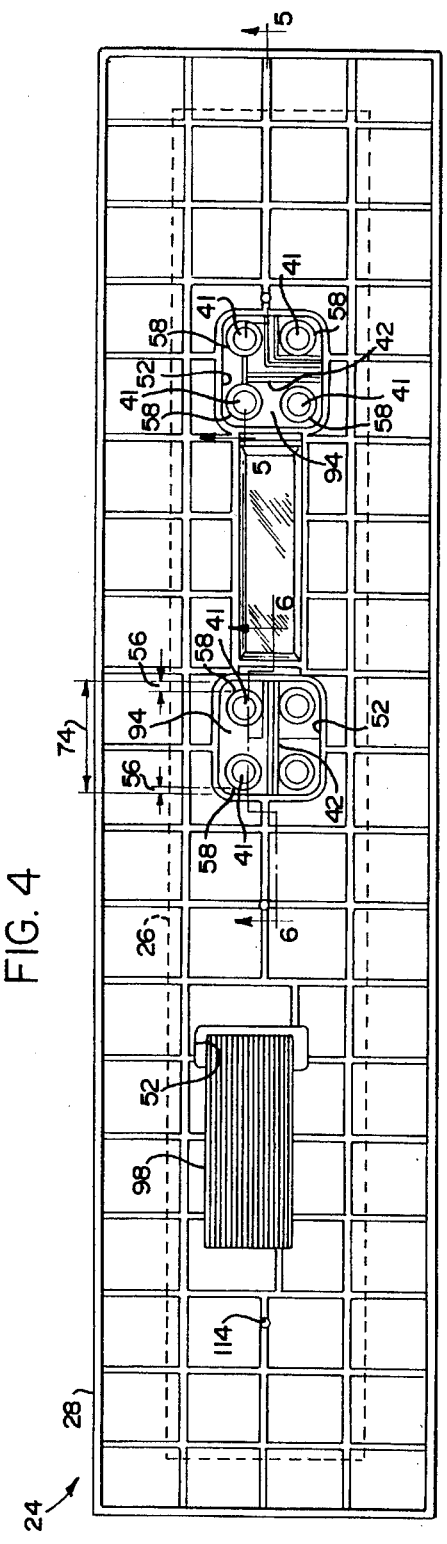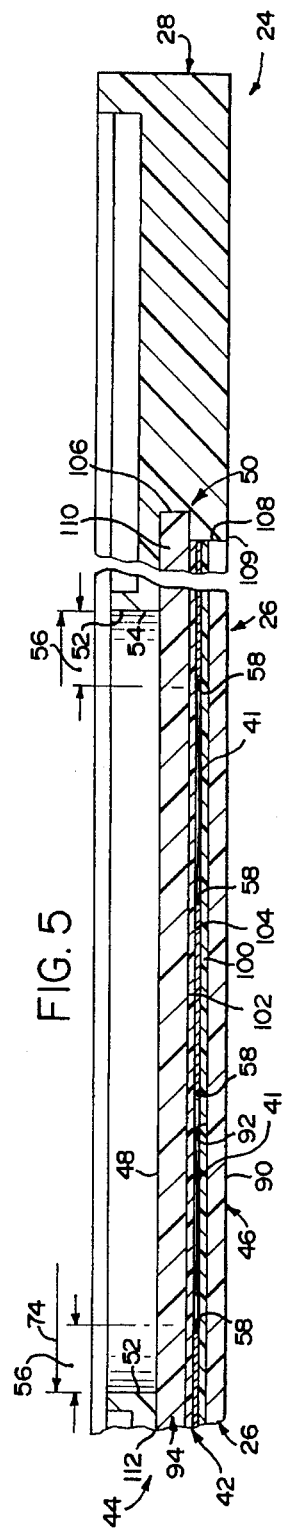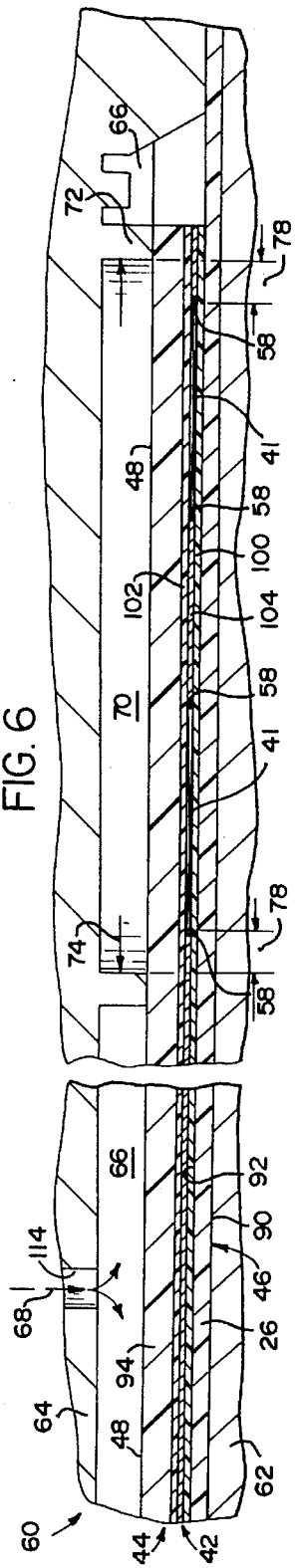

DEVICE PANEL WITH IN-MOLDED APPLIQUE

BACKGROUND

The present invention relates to a molded assembly and a method for producing a molded assembly. The molded assembly includes an applique or face panel which is in-molded in an injection molded process.

Switches, lamps, and other devices which are used as indicators, controls or displays are an essential component of many appliances and devices. It is often an important design consideration that such devices be efficiently and inexpensively produced with a high degree of reliability and to provide ease of assembly or integration into the particular device or appliance. Further reference will be made to switches although it should be understood that the discussion of devices is intended to be interpreted broadly and to include such devices as displays, indicator lamps and other such devices.

An example of switches used with an appliance may be found on a number of devices either in the office or at home. Such devices may include industrial machines, computers, photo copiers, household appliances such as microwave ovens, stoves, washing machines and dryers. These switches are by no means limited to stationary equipment but may also be found on vehicles such as automobiles, boats, jettskis as well as other devices including exercise equipment and vending equipment.

As a practical matter, it is desirable to assure that the devices such as switches will operate reliably for a sufficiently long product life. This of course may depend on the type of application. It is also desirable to provide a switch which is easy to maintain regardless of the environment in which it operates. This is an especially important consideration in such environments as industrial environments, home environments such as the kitchen, as well as high use areas such as vending equipment and exercise equipment.

A number of prior art switches are available which are discreet components which plug into or connect to a switch panel. These discreet components often project though an opening in the panel with the body or the mechanical components of the switch being positioned behind the panel. While this type of switch is feasible for some applications, many applications require an integrated switch. An integrated switch is integrated into the surface of the control panel thereby eliminating an opening through the panel surface. The elimination of the opening through the panel surface improves maintainability and reliability by preventing the buildup of material in the switch which may enter the switch though the opening in the panel.

In response to the need for an integrated switch, a number of electro mechanical or solid state switches have been devised. One form of switch is a "dome" switch. The dome switch includes a surface membrane which provides graphical representations of switches and appropriate indicia or text identifying the switch or various switch conditions. A domed structure is positioned behind the membrane and a mechanical component of the switch is positioned behind the dome. This type of dome switch provides a barrier between the operator and the switch components thereby improving the reliability of the switch. This type of switch, however, has a problem in that after numerous actuations, the dome portion of the switch may fail thereby requiring replacement of the switch. Therefore, it would be desirable to provide a switch which eliminates this mechanical operating aspect.

Further developments have led to a mechanical switch which is essentially comprised of separated circuitry. Circuit paths are formed on membrane material providing the essential electrical paths for the circuit. Portions of these circuit paths are separated by a small gap thereby providing the "open" structure of a switch. When pressure is applied to the circuit material, the open portion of the switch is closed, thereby resulting in the actuation of the switch. Since the circuitry is very small and the gap between the open portion of the circuit is also very small, only a slight pressure needs to be applied to the surface of the switch panel to actuate the switch. This type of switch has the advantage in that the dome component is not required, thereby eliminating potential for mechanical failure.

Many applications of this type of "touch panel" switch can be found on home appliances such as ovens, and washing machines. A face applique is reverse printed with the control graphics and indicia to represent to the user a familiar mechanical type switch. A panel circuit including switch circuity is attached to the reverse side of the face applique which is in turn attached to the appliance by means of an appropriate adhesive. In such a touch panel, a portion of circuitry extends from the panel circuit to provide a connector between the panel circuit and the circuitry in the appliance.

A problem arises in the application of such touch panel switches in that in many environments, the panel may separate from the appliance which may result in complications or a reduction in the reliability of the touch panel control switch. For example, if a touch panel control switch assembly is attached to a washing machine, moisture from the washing machine may short out the circuitry or act on the adhesive and thereby loosen the touch panel from the appliance. Similarly, but in a different fashion, if such a touch panel control is used on an oven or dryer, the elevated temperatures produced by the appliance may result in a softening of the adhesive thereby producing a loosening or release of the panel from the appliance.

Therefore, it would be desirable to integrally mold such a touch panel into a molded assembly such that the touch panel is at least partially encapsulated in the molded assembly. Heretofore, it is unknown to Applicant that such an "in-molding" process has been successful with such touch panel control switches. A foremost problem which occurs during the in-molding process is that the molding forces tend to close or fuse the switch circuitry resulting in switch failure. During the molding process, the mold portions come together and introduce molten plastic over the touch panel assembly. The injection forces press against the panel thereby forcing the switch into a closed position. As a result of the mechanical forces and elevated temperature, the switches may become permanently deformed or even fused thereby resulting in an inoperative switch.

For the foregoing reasons, there is a need for a method and molded assembly in which a touch panel is in-molded into a molded assembly.

OBJECT AND SUMMARY

A general object which is satisfied by the invention is to provide a method of molding a touch panel into a molded assembly to provide a single assembly which may be attached to an appliance or related device.

Another object which is satisfied by the invention is to provide a molded assembly in accordance with the methods taught herein.

Yet another object which is satisfied by the invention is to provide a molded assembly which at least partially encapsulates a touch panel without reducing the integrity of the device associated with the touch panel.

Briefly, and in accordance with the foregoing, the present invention envisions a method of producing a molded assembly which at least partially encapsulates a touch panel structure. The method includes providing a touch panel structure which has a front side, a reverse side and an edge extending therebetween. A panel circuit is attached to the panel structure and includes at least one device. The panel is positioned in a cavity of a plastic injection mold which includes at least one hollow shutoff positioned relative to the device on the touch panel. When the mold is closed, a rim portion of the hollow shutoff is positioned against the reverse side of the panel spaced away from the device so as to at least partially shield the portion of the panel containing the device from the injection molding environment. The present invention also envisions a product produced by this method.

The present invention also envisions a molded assembly which includes a touch panel in which the touch panel is retained in a molded portion and the devices associated with the touch panel are not degraded during the molding process. A window is provided on the reverse side of the touch panel. Additionally, a barrier material may be applied to the reverse side of the panel prior to molding so as to form a seal between the molded portion and the touch panel in the area of the window positioned relative to the device.

BRIEF DESCRIPTION OF THE DRAWINGS

The organization and manner of the structure and function of the invention, together with further objects and advantages thereof, may be understood by reference to the following description taken in connection with the accompanying drawings, wherein like reference numerals identify like elements, and in which:

FIG. 1 is a perspective view of a washing machine employing a molded assembly of the present invention;

FIG. 2 is a perspective view of a combination range and oven employing a molded assembly of the present invention;

FIG. 3 is an enlarged, partial fragmentary, perspective view of a molded assembly of the present invention which incorporates several devices;

FIG. 4 is a partial fragmentary plan view of a reverse side of the molded assembly as shown in FIG. 3;

FIG. 5 is an enlarged, partial fragmentary, cross sectional view of the molded assembly taken along line 5—5 in FIG. 4; and FIG. 6 is an enlarged, partial fragmentary, cross sectional view of the molded assembly generally taken along line 6—6 in FIG. 4 and in accordance with the present invention retained in a cavity of an injection molding mold prior to injection of molten plastic therein.

DESCRIPTION

While the present invention may be susceptible to embodiment in different forms, there is shown in the drawings, and herein will be described in detail, an embodiment with the understanding that the present description is to be considered an exemplification of the principles of the invention and is not intended to limit the invention to that as illustrated and described herein.

With reference to FIGS. 1 and 2, appliances, a washing machine 20 as shown in FIG. 1 and a combination range and stove 22 as shown in FIG. 2 employ a molded assembly 24. The molded assembly 24 includes a face applique 26 and a molded portion 28. The molded assembly 24 provides a touch control panel to operate the respective appliance 20, 22. FIGS. 1 and 2 are illustrative of two typical yet somewhat extreme conditions in which such a touch control panel must function. With reference to FIG. 1, the environment may include heated water or steam which is vented or may escape from the washing machine. In the case of FIG. 2, such appliances combining a range and oven 22 often include a vent 30 positioned between the control panel 24 and the range top 32 which vents heated air from the oven portion 34. In this situation, the touch control panel 24 is exposed to prolonged elevated temperatures as the heated air is exhausted from the oven 34 through the vent 30.

FIG. 3 provides a substantially enlarged view of a portion of the molded assembly 24 removed from the appliances 20, 22. It is this molded assembly 24 and the method of producing this assembly which are the objects of the invention. In order to more fully describe the method and article of the present invention, further reference is made to FIGS. 4–6. The molded assembly 24 includes a plurality of controls 40 shown on the face applique 26. The controls 40 as shown in FIG. 3 are shown in FIG. 4 as components or devices 41 connected to panel circuitry 42. In FIGS. 5 and 6 the devices 41 are generally shown as block elements. In this regard, while the controls 40 are shown in a grouping in FIG. 3 and as discreet switch type components 41 in FIGS. 4–6, it should be understood that other types of devices or controls are anticipated and included in the present invention and claims. However, in the interest of clarity, reference will be made to the devices or controls as switches with the understanding the broader interpretation will apply. Further, the shape of the assembly is shown as rectangular although there are no known restrictions which require only a rectangular shape to be used and the present application should not be limited to the shape of the illustrated embodiment.

As shown in FIG. 5, the molded assembly includes a panel structure 44 which is at least partially encapsulated by the molded portion 28. The panel structure 44 includes a front side 46, a reverse side 48, and an edge 50 therebetween. The molded portion 28 is generally molded over the reverse side 48 and abuts at least a portion of the edge 50 of the planar structure 44.

The devices 41 are associated with the panel structure 44 as will be described in greater detail hereinbelow. The molded portion 28 defines a window 52 which exposes an area of the reverse side 48 of the panel structure 44. The window 52 is intentionally positioned in the molded portion 28 corresponding to the location of the devices 41 for preventing the molded plastic of the molded portion 28 from adversely affecting the devices. The area of the window 52 is defined as being slightly larger than the area occupied one or more devices 41 such that a perimeter 54 of the window 52 is spaced away (see dimension line 56) from an outer edge 58 of the devices 41 associated with the panel structure 44.

The brief description of the molded assembly 24 will be elaborated on hereinbelow after more fully describing the method of the invention. The method of the invention includes positioning the panel structure 44 in a plastic injection mold 60. The mold 60 includes a front portion 62 and a rear portion 64. The front and rear portions 62, 64 define a cavity 66 therebetween. Sufficient clearance is provided between the mold portions 62, 64 for the panel structure 44 to be positioned therein. The panel structure 44 is positioned relative to one of the mold portions 62, 64 and the other mold portion is brought into position to enclose the panel structure in the cavity 66. Locator pins may be provided on one of the portions 62, 64 and corresponding apertures (not shown) may be provided on the panel structure 44 to provide positive positioning of the panel structure 44 relative to the mold 60.

Once properly positioned in the mold 60 molten plastic (diagrammatically represented by arrows 68) is injected into the cavity 66 and against the panel structure 44. The injected plastic presses against the reverse side 48 to expel air from between the face applique 26 and the mold portion 62 thereby further assuring positive positioning of the panel structure 44 in the mold 60. The molten plastic fills the connected areas of the cavity 66 thereby in-molding the panel structure 44 into the molded portion 28.

Of particular importance to the present invention are hollow shutoffs 70 which are formed in the rear mold portion 64. The hollow shutoffs 70 include a rim 72. The area 74 defined by the rim 72 corresponds to the window 52. A dimension 78 between the rim 72 and the outer edge 58 of the device 40 provides a space which corresponds to the resulting space 56 between the perimeter 54 of the window 52 and the outer edge 58 of the device 40.

The dimensional difference spacing the rim 72 away from a corresponding area related to the device results in the formation of the window 52 in the final molded portion 28. The molding of the windows 52 and the use of the hollow shutoffs 70 is important such that the area of the panel section 44 occupied by the devices 40 is protected from the injection molding environment. The injection molding environment includes, but is not limited to, the compressive mold clamping forces applied to the front side 46 as well as the reverse side 48 of the panel structure. Additionally, by sheltering or shielding the portion of the panel structure 44 occupied by the device 41, the device 41 is not subjected to the same elevated temperature as it would be if molten plastic were applied directly to the reverse surface 48 of the panel 44. The protection of the devices 41 results in preventing failure, fusing, or other mechanical or electrical problems in the devices 41.

We now turn to a further description of the assembly 24 which was briefly described hereinabove. The panel structure 44 includes several layers which are combined in order to provide the resulted panel structure 44 which is in-molded into the molded portion 28. The panel structure includes the face applique 26 which has a first surface 90 generally defined by the front side 46 of the panel structure 44 and a second surface 92 opposite the first surface 90. The second surface 92 is reverse printed 26 so as to protect the printing from wear. A back panel 94 is positioned opposite the front applique 26 and defines the reverse side 48 of the panel structure 44.

The devices 41 are sandwiched between the face applique 26 and the back panel 94. The panel circuit layer 42 is positioned between the face applique 26 and the back panel 94 and contains or is coupled to the devices 41. As shown in FIG. 4, the circuit layer 42 in the form of a connector ribbon cable 98 projects through the back panel portion 94. In the area between the face applique 26 and the back panel 94 which is not occupied by a circuit layer 42, a spacer 104 generally having the same thickness dimension as the circuit layer 42 is positioned in order to maintain a consistent overall thickness dimension of the panel structure 44. A window 52 is also formed around the ribbon cable 98 as it protrudes from the reverse side 48 of the assembly 24.

As shown in FIGS. 5 and 6, the circuit layer 42 includes two membrane sheets 100, 102 with circuitry and spacer 104 positioned thereon or therebetween. Other forms of the circuit layer 42 may be used in this application as well as directly applying the circuitry to the face applique 26. In the present illustrated embodiment, however, the spacer 104 is applied to or positioned between the membranes 100, 102.

The back panel 94 is a generally rigid structure which provides a strengthening and reinforcing function in the panel structure 44. As shown in FIG. 5, an edge 106 of the back panel 94 extends away from a perimeter 108 of the face applique 26. The extending edge 106 defines a lip portion 110 of the panel 94. When the molded portion 28 is molded over the panel structure 44 plastic overlaps the lip to at least partially encapsulate the back panel 94. This partial encapsulation provides added structural connection between the molded portion 28 and the panel structure 44. Further, the molded plastic overlapping the lip 110 and abutting the perimeter 108 of the face applique 26 can be fused with the face applique 26 upon selecting the appropriate materials to create the fusion to create a fused arc 109 joining the materials of the overlapping lip 110 and the perimeter 108 of the face applique 26. The edge of the face applique 26 molded into the molded portion 28 is level with a corresponding edge of the molded portion 28 resulting in no lip to accumulate liquid or particles or to allow liquid to seep between the panel structure and the molded portion by capillary action. Further, the fusion of the materials in the fused area 109 between the molded portion 28 and the panel structure 44 prevents separation of the face applique 26 from the assembly 24.

As noted hereinabove in the background section, one of the many advantages of the invention is to securely retain the face applique 26 on the molded assembly 24 to prevent the face applique from lifting off the appliance as may occur in prior art touch panels. An additional consideration is to at least partially encapsulate the panel structure 44 in the molded portion 28 so as to essentially hermetically seal the circuitry from the ambient environment. In this regard, the window areas 52 are not sealed by the molded portion 28. In order to seal this area, a sealing moisture barrier 112 may be applied to the reverse side 48 of the panel structure 44. When the plastic material is molded over the panel structure, the area of the reverse side 48 within the window 52 is still sealed by virtue of the moisture barrier coating 112. The moisture barrier effectively providing a complete water seal and encapsulation of the switch circuitry for uses such as in the boating and other marine devices such as jettskis, and other devices.

In use, the panel structure 44 is in-molded into a molded portion 28. The panel structure 44 is placed into a plastic injection mold 60 which includes a portion 64 which abuts the reverse side 48 which has a hollow shutoff 70. The hollow shutoff 70 is positioned over the reverse side 48. When the mold portions 62, 64 are closed, pressure is not applied to the devices 41 and molten plastic does not come in contact with the reverse side 48 in the shutoff area 74. The hollow shutoff 70 effectively protects or shields the shutoff area which includes the devices 41 thereby preventing fusing or mechanical deformation of the circuitry in the devices 41 or other damage to the device during the injection molding process.

When molten plastic 68 is injected into the mold cavity 66 it presses against the reverse side 48 and thereby presses the front side 46 of the applique 26 against the abutting portion of the mold 62. In this manner, the gate or gates 114 are positioned centrally so as to force the front side 46 of the panel structure 44 against the mold 62. After injection of the plastic, the mold portions 62, 64 are disengaged resulting in the finished assembly 24 in which the panel structure is at least partially encapsulated by the molded portion 28.

While a preferred embodiment of the present invention is shown and described, it is envisioned that those skilled in the art may devise various modifications of the present invention without departing from the spirit and scope of the appended claims. The invention is not intended to be limited by the foregoing disclosure.

The invention claimed is:

1. A molded electrical circuit assembly comprising:

a generally continuous panel structure having a front side, a reverse side and an edge extending therebetween;

at least one electrical component having a portion thereof positioned against said reverse side of said panel structure;

an integral, single piece molded portion molded generally over and abutting said reverse side of said panel structure and abutting at least a portion of said edge of said panel structure;

said molded portion defining at least one window through said molded portion exposing an area of said reverse side of said panel structure, said window being positioned in said molded portion aligned with said at least one electrical component and having a perimeter spaced away from an outer edge of said at least one electrical component.

2. A molded electrical circuit assembly as recited in claim 1, said panel structure comprising:

a face applique, a first side of said face applique defining said front side of said panel structure and a second side of said face applique being positioned opposite said front side;

a back panel overlying said second side of said face applique, an exposed side of said back panel defining said reverse side of said panel structure, said molded portion being molded over said reverse side.

3. A molded electrical circuit assembly as recited in claim 2, wherein said back panel extends beyond a perimeter of said face applique defining a lip portion of said back panel, said molded portion being molded over at least a portion of said lip for at least partially encapsulating said back panel in said molded portion.

4. A molded electrical circuit assembly as recited in claim 3, further comprising a fused area between said molded portion overlying said lip and said perimeter of said face applique said fused area preventing separation of said face applique from said circuit assembly.

5. A molded electrical circuit assembly as recited in claim 1, said panel structure further comprising:

a panel circuit layer disposed relative to said reverse side of said panel structure, said at least one electrical component being coupled to said panel circuit layer, said molded portion being molded over said panel circuit layer, said window through said molded portion being positioned over said electrical component coupled to said panel circuit layer.

6. A molded electrical circuit assembly as recited in claim 5, comprising said panel circuit layer positioned between said face applique and said panel.

7. A molded electrical circuit assembly as recited in claim 1, further comprising:

a panel circuit layer disposed in said panel structure, and said electrical component is a switch coupled to said panel circuit layer.

8. A molded electrical circuit assembly as recited in claim 1, further comprising:

a panel circuit layer disposed in said panel structure, and said electrical component is an indicator lamp coupled to said panel circuit layer.

9. A molded electrical circuit assembly as recited in claim 1, further comprising:

a panel circuit layer disposed in said panel structure, and said electrical component is a display device coupled to said panel circuit layer.

10. A molded electrical circuit assembly as recited in claim 1, further comprising:

a moisture barrier disposed between said reverse side of said panel structure and an abutting side of said molded portion, said moisture barrier forming a seal between said reverse side of said panel structure and said molded portion and sealing said area of said reverse side of said panel structure lying within said window through said molded portion.

11. A molded assembly comprising:

a generally continuous face applique having a first side, a second side and an edge extending therebetween;

a back panel having a side overlying said second side of said face applique and a reverse side;

a panel circuit layer disposed between said face applique and said back panel;

at least one electrical component coupled to said panel circuit layer;

an integral, single piece molded plastic portion molded over and abutting said reverse side of said back panel; and said molded portion defining at least one window through said molded portion exposing an area of said reverse side of said back panel, said window being positioned in said molded portion aligned with said at least one electrical component and having a perimeter spaced away from an outer edge of said at least one electrical component with said window surrounding said electrical component for preventing the molded portion from adversely affecting said electrical component during the molding process.

12. A molded assembly as recited in claim 11, wherein said back panel extends away from a perimeter of said face applique defining a lip portion of said back panel, said molded portion being molded over said lip for at least partially encapsulating said back panel.

13. A molded assembly as recited in claim 12, wherein said molded portion overlying said lip is fused to said edge of said face applique and generally co-planar with said first side of said face applique.

14. A molded assembly as recited in claim 11, further comprising:

a moisture barrier disposed between said back panel and said molded portion, said moisture barrier forming a seal between said back panel and said molded portion and sealing said area of said back panel lying within said window through said molded portion.

* * * * *